(12) United States Patent
Schutt et al.

(10) Patent No.: US 7,306,239 B2
(45) Date of Patent: *Dec. 11, 2007

(54) HEIGHT CONTROL SYSTEM AND SENSOR THEREFOR

(75) Inventors: Randy Schutt, Holland, MI (US); David Bolt, Grand Haven, MI (US)

(73) Assignee: Haldex Brake Corporation, Kansas City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/243,151

(22) Filed: Oct. 4, 2005

(65) Prior Publication Data

US 2006/0027991 A1    Feb. 9, 2006

Related U.S. Application Data (63) Continuation of application No. 10/296,518, filed as application No. PCT/US01/16950 on May 24, 2001, now Pat. No. 6,991,239.

(60) Provisional application No. 60/208,426, filed on May 25, 2000.

(51) Int. Cl.
   *B60G 17/04*    (2006.01)
(52) U.S. Cl. .............................. 280/5.514; 280/6.157; 280/6.151; 280/124.116; 280/124.16; 250/222.1; 250/224; 250/231.13

(58) Field of Classification Search ............. 280/5.514, 280/6.151, 6.157, 124.157, 124.16, 124.128, 280/124.116; 250/231.13, 224, 221, 222.1
See application file for complete search history.

(56) References Cited

U.S. PATENT DOCUMENTS

| 4,386,791 A | | 6/1983 | Watanabe |
| 4,540,188 A | | 9/1985 | Meloche et al. |
| 4,864,295 A | | 9/1989 | Rohr |
| 4,923,210 A | | 5/1990 | Heider et al. |
| 5,707,045 A | * | 1/1998 | Easter ..................... 267/64.21 |
| 5,859,692 A | * | 1/1999 | Ross et al. ................. 356/4.01 |
| 6,342,879 B1 | * | 1/2002 | Hantom ...................... 345/161 |

FOREIGN PATENT DOCUMENTS

| EP | 0551986 | 7/1993 |
| GB | 2264784 | 9/1993 |
| JP | 61268511 | 11/1986 |
| WO | WO/9424534 | 10/1994 |

* cited by examiner

*Primary Examiner*—Ruth Ilan
(74) *Attorney, Agent, or Firm*—St. Onge Steward Johnston & Reens LLC (57) ABSTRACT

A sensor for a height control system uses a transducer to detect changes in position of an arm relative to a vehicle and sends a proportional signal to a microprocessor that, in turn, actuates a pneumatic valve operably connected to an air spring between the arm and the vehicle. The transducer includes an optical bridge, a variable capacitor, or a flexible variable resistor.

15 Claims, 12 Drawing Sheets

HEIGHT CONTROL SYSTEM AND SENSOR THEREFOR

CROSS-REFERENCE TO RELATED APPLICATIONS

This application is a continuation of currently pending U.S. patent application Ser. No. 10/296,518, filed Apr. 22, 2003 now U.S. Pat. No. 6,991,239, which was a National Phase entry of International Application No. PCT/UD01/16950, filed in the US on May 24, 2001 designating the United States of America, which claims the benefit of U.S. Provisional Application 60/208,426 filed May 25, 2000.

FIELD OF THE INVENTION

The invention relates to a sensor for sensing rotational and linear displacement and more particularly for a sensor used in a vehicle with a pneumatic suspension having a height control system. In another aspect, the invention relates to a height control system having a sensor for detecting changes in the vehicle ride height and controlling the pneumatic suspension in response to the sensor output to adjust the vehicle height. In yet another aspect, the invention relates to a trailing arm suspension having a rotatably mounted arm whose movement is damped by an airbag in combination with a height control sensor that detects changes in the vehicle ride height relative to a reference ride height based on the rotation of the arm and correspondingly controls the pneumatic pressure within the airbag to adjust the vehicle height.

BACKGROUND OF THE INVENTION

Pneumatic or pressurized-air height control systems are known and commonly used in heavy-duty vehicles, such as semi/tractor-trailers. A common implementation of such a height control system is a trailing arm suspension. The trailing arm suspension comprises a trailing arm having one end pivotally mounted to a bracket depending from a portion of the vehicle frame to permit rotation of the arm relative to the vehicle frame. The arm carries an axle on which the wheels of the vehicle are rotatably mounted. An air spring comprising an inflatable air bag is positioned between another portion of the arm and vehicle frame. Any changes in the vehicle ride height relative to a predetermined reference height pivots the arm, causing a corresponding compression or expansion of the airbag. The height of the vehicle can be controlled by adding or exhausting pressurized air from the air bag. Changes in the ride height typically occur during the loading and unloading of the vehicle.

Current trailing arm suspensions use a mechanical height control valve to control the introduction and exhaustion of pressurized air into the airbag. The height control valve comprises an inlet port fluidly coupled to a source of pressurized air on the vehicle, an airbag port fluidly coupled to the airbag, and an exhaust port fluidly coupled to the atmosphere. An actuating arm extends from the height control valve and is operably coupled to the trailing arm usually by an adjustable length rod. Rotation of the trailing arm correspondingly moves the arm of the height control valve. The arm of the height control valve moves an internal valve within the height control valve to either fluidly connect the pressurized air port to the air spring port or the air spring port to the exhaust port and thereby introduce or exhaust, respectively, pressurized air from the airbag. Setting the vehicle ride height for this type of mechanical height control valve is typically accomplished by adjusting the length of the rod connecting the trailing arm to the actuating arm of the height control valve.

A disadvantage of the current system is that the mechanical components are subject to damage during the normal operation of the trailing arm suspension or by technicians working on the suspension. If the connecting rod or the rotating arm of the height control valve are bent, it can alter the preset ride height of the height control valve and adversely effect the operation of the suspension. Additionally, if left unused for an extended period of time, generally greater than a 24 hour period, the height control valve can "freeze" in its current position, resulting in the failure of the height control valve to perform correctly until the responsible component of the height control valve is released.

It is desirable to have a trailing arm suspension and a height control sensor that is less susceptible to the hostile environment that degrades the performance of the current mechanical sensors for height control valves.

SUMMARY OF THE INVENTION

The invention relates to a vehicle having a pneumatic or air-operated suspension capable of controlling the vehicle ride height and a sensor that senses changes in the ride height and controls the introduction and exhaustion of pneumatic fluid, such as air, to adjust the vehicle ride height. Preferably, the vehicle comprises a trailing arm suspension having a trailing arm with one portion pivotally mounted relative to a vehicle frame and carrying an axle on which the vehicle wheels are supported. An air spring is disposed between another portion of the trailing arm and the vehicle frame and resists the rotational movement of the trailing arm relative to the vehicle frame in response to reaction forces applied to the trailing arm through the axle and the ground engaging wheels. A pneumatic system controls the introduction and exhaustion of pressurized air into the air spring to adjust and control the vehicle ride height. Pressurized air can be added to the air spring or exhausted from the air spring to raise and lower the vehicle ride height, respectively.

A sensor is provided to monitor the change in the position of the trailing arm relative to the predetermined or reference ride height and to determine the change required in the vehicle ride height, if any, to return the ride height to the reference ride height. The sensor controls the introduction and exhaustion of pressurized air into the airbag to make the necessary adjustment to keep the vehicle at the reference ride height.

The sensor can comprise a light emitter that is functionally coupled to the trailing arm and emits a light that is received on a light sensor, such as a photoconductive cell or photodiode detectors arranged in an optical bridge structure. The change in the light intensity is detected by the sensor. The emitted light can be a focused point source which is diffused prior to striking the light sensors. As the trailing arm moves, the diffused light source is moved relative to the light sensors resulting in a change in intensity seen by each light source. The change of intensity is converted into an output signal from the height sensor and used to control the introduction and exhaustion of pressurized air into the airbag.

The light emitter can alternatively comprise a collimated light projected through a diffraction slit, resulting in a diffraction pattern being directly projected onto the optical bridge. As the light emitter rotates in correspondence with the movement of the trailing arm, the diffraction pattern moves relative to the light sensors, which outputs a corresponding signal proportional to the change in intensity as seen by each sensor.

In yet another alternative, the light emitter can be fixed relative to the trailing arm and a fresnel lens or similar device is disposed between the light emitter and a diffuser in front of the optical bridge while being coupled to the trailing arm. The rotational movement of the trailing arm is converted into translational movement of the fresnel lens relative to the light emitter resulting in a point light source moving across the diffuser. The diffused spot of light moves relative to the light sensors altering the intensity seen by each light sensor.

The sensor can also take the form of a variable capacitor having multiple fixed capacitive plates arranged in two electrically distinct series and moveable capacitive plates disposed between the two series of fixed plates. The moveable plates are functionally coupled to the rotational movement of the trailing arm. As the rotating plates move relative to the fixed plates in response to the trailing arm rotation, the capacitance of one series changes relative to the other. The change in the capacitance between each series is proportional to the rotation of the trailing arm and is used to control the addition and exhaustion of air from the air springs to adjust the vehicle height.

A final form of the sensor comprises a flexible variable resistor that is functionally connected to the trailing arm. As the flexible variable resistor is bent its resistance changes accordingly. The sensor outputs a signal corresponding to the change in the resistance and is used to control the addition and exhaustion of air from the air springs to adjust the vehicle height.

DETAILED DESCRIPTION OF THE EMBODIMENTS

Figure 1:
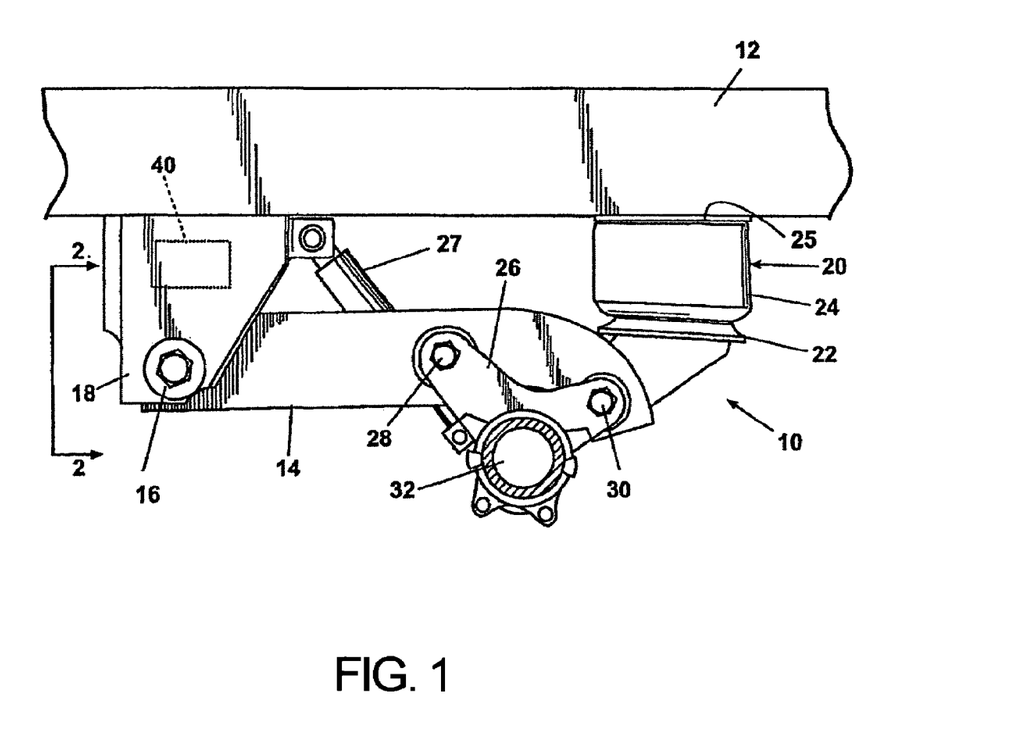
FIG. 1 illustrates a trailing arm suspension incorporating a first embodiment of a height sensor according to the invention.

FIG. 1 illustrates a trailing arm suspension 10 mounted to a vehicle frame 12. The trailing arm suspension 10 comprises a trailing arm 14 having one end pivotally mounted through a bushed connection 16 to a frame bracket 18 depending from the vehicle frame. An air spring 20 comprising a piston 22 mounted to a portion of the trailing arm 14 and an airbag 24 mounted to the frame 12 through a plate 25 connects the other end of the trailing arm 14 to the vehicle frame 12. An axle bracket 26 is flexibly mounted to the trailing arm 14 between the frame bracket 18 and the air spring 20 by a pair of bushed connectors 28, 30. The axle bracket mounts an axle 32 to which the ground engaging wheels (not shown) of the vehicle are rotatably mounted. A shock absorber 27 extends between the axle bracket 26 and the frame bracket 18.

Although the operation of a trailing arm suspension is widely known, a brief summary will be useful in understanding the invention. As the wheels of the vehicle encounter changes in the road surface, they apply a reactive force to the trailing arm, pivoting the trailing arm 14 relative to the frame bracket 18 and the vehicle frame 12. The pivoting movement of the trailing arm 14 is resisted by the air spring 20.

In addition to resisting the rotational movement of the trailing arm 14, the air spring 20 is also used to adjust the height of the frame 12 relative to the ground. For example, assuming static conditions, as air is introduced into the airbag 24, the vehicle frame 12 is raised relative to the trailing arm 14, since the trailing arm 14 is effectively fixed relative to the ground because of the contact between the ground and the ground engaging wheels. Similarly, if pressurized air is exhausted from the airbag 24 the vehicle frame 12 will lower in height relative to the ground. These aspects of a trailing arm suspension are widely known to those skilled in the art.

It should be noted that the trailing arm suspension herein illustrates only a preferred embodiment of the invention. The invention can be used in other types of suspensions. For example, in suspensions not using an air spring, other suitable actuators capable of adjusting the vehicle height can be used. In most cases the actuator will extend between a portion of the suspension, usually a moveable element or arm, and the vehicle. Other possible actuators include extendable cylinders, pneumatic or hydraulic. Moreover, the invention will find applicability in other aspects of a vehicle where relative displacement of components must be determined as described hereinafter.

Figure 2:
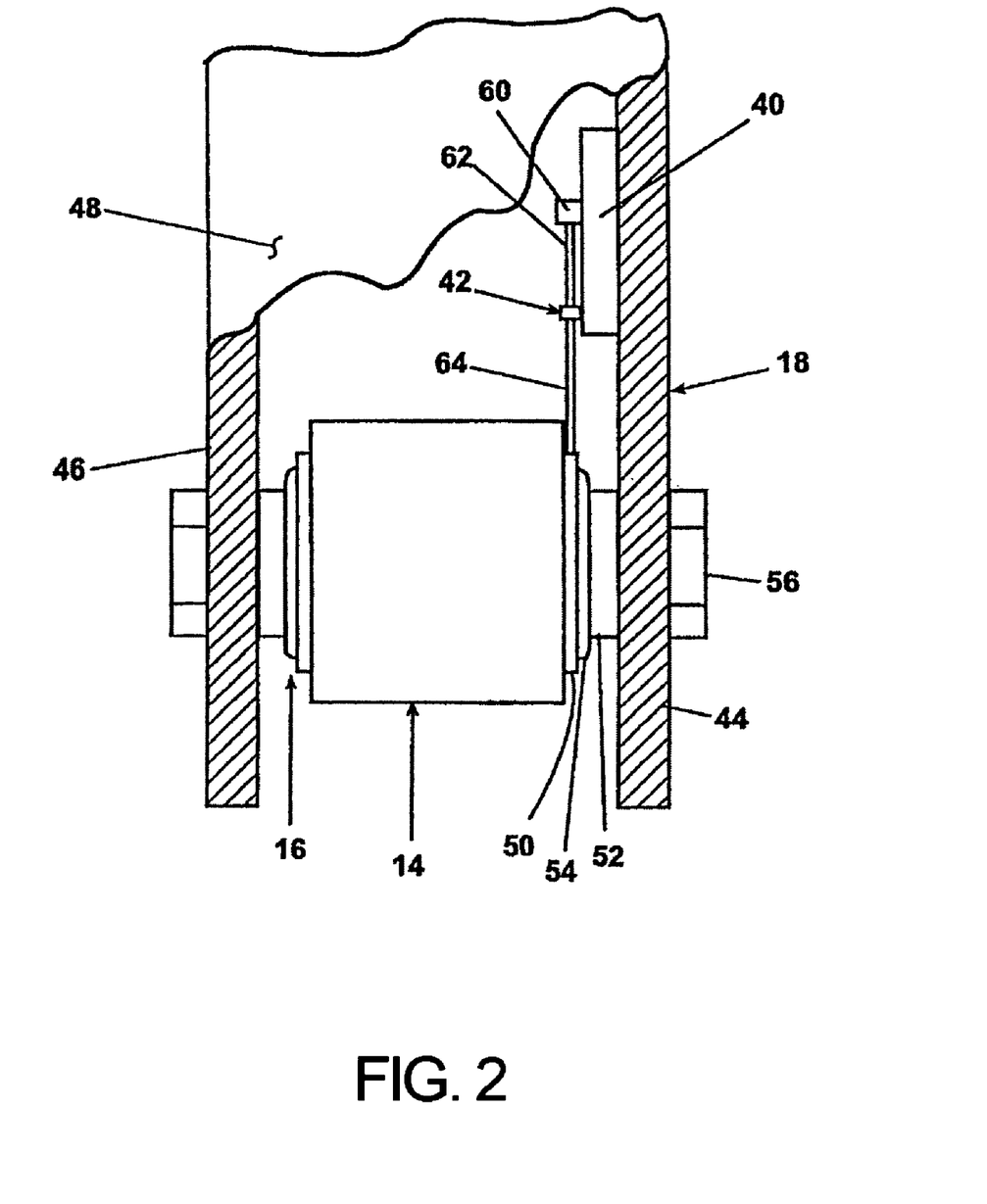
FIG. 2 is a partially cut away end view taken along 2-2 of FIG. 1 illustrating the mechanical connection between the sensor and the trailing arm suspension.

Referring now to FIGS. 1 and 2 a sensor 40 is fixedly mounted to the interior of the frame bracket 18 and operably coupled to the bushed connector 16 through a link 42. The frame bracket 18 has opposing sidewalls 44, 46 that are connected by an end wall 48. The bushed connector 16 comprises an outer sleeve 50 that is press-fit within the trailing arm 14 and an inner sleeve 52 that is concentrically received within the outer sleeve 50. An annulus of elastomeric material 54 is compressively retained between the outer sleeve 50 and the inner sleeve 52. The inner sleeve 52 is longer than the outer sleeve 50 resulting in the ends of the inner sleeve 52 abutting the inner surfaces of the sidewalls 44, 46 respectively. A mounting bolt 56 compressively mounts the sidewalls 44, 46 against the ends of the inner sleeve 52 to fix the inner sleeve relative to the frame bracket 18. With this construction, the pivotal movement of the trailing arm results in the rotation of the outer sleeve 50 relative to the inner sleeve 52. The rotation is permitted by the elastomeric annulus 54, which enables the outer sleeve 50 to rotate relative to the inner sleeve 52.

The sensor 40 contains an external shaft 60 that is coupled to the link 42, which is connected to the outer sleeve 50. The link 42 can have any suitable shape so long as the rotational movement of the outer sleeve is correspondingly transferred or coupled to the rotation of the external shaft 60. For example, the link can comprise arms 62, 64 which are connected by one of the arms having a pin that is received in a slot in the end of the other arm, thereby the rotational movement of the outer sleeve is correspondingly transferred to the external shaft 60 of the sensor 40 while accommodating any relative vertical movement between the arms 62, 64.

The sensor 40 will now be described in greater detail with reference to FIGS. 3 and 4. The sensor 40 comprises a light emitter 70 that is mounted to the external shaft 60. The light emitter 70 preferably is formed from a solid block 72 of metal or plastic having a light source chamber 74 and a light passage 76 optically connecting the light chamber 72 to the exterior of the light emitter 70. A light source 78, such as a light emitting diode or a laser, is positioned within the light chamber 74 and emits light that exits the block 72 through the light passage 76 along path A.

The sensor 40 further includes a light sensor assembly 90 comprising a light-tight housing 92 having an open end in which is fixedly placed a diffusing element 94, such as frosted glass. A light detector in the form of an optical bridge 96 is positioned within the light-tight housing 92 behind the diffusing element 94. The optical bridge 96 includes two spaced sensors 98, 100, which can be photoconductive cells or photodiode detectors. Each light sensor outputs a voltage signal representative of the intensity of the light it receives. The voltage signals and their differences are used to assess a change in the vehicle height. The optical bridge 96 is preferably a sensitive Wheatstone bridge circuit using photoconductive cells in either a half bridge (2 cells) or a full bridge (4 cells) arrangement.

The operation of the light sensor 40 is best described by reference to FIGS. 3 and 4. FIG. 3 illustrates the position of the light emitter 70 when the vehicle is at a reference ride height. It should be noted that although FIG. 3 illustrates the light emitter 70 being oriented substantially perpendicular to the light sensor assembly 90 when the vehicle is at the reference ride height, the light emitter 70 can be oriented at an angle relative to the light sensor assembly 90 to establish the reference ride height.

Figure 3:
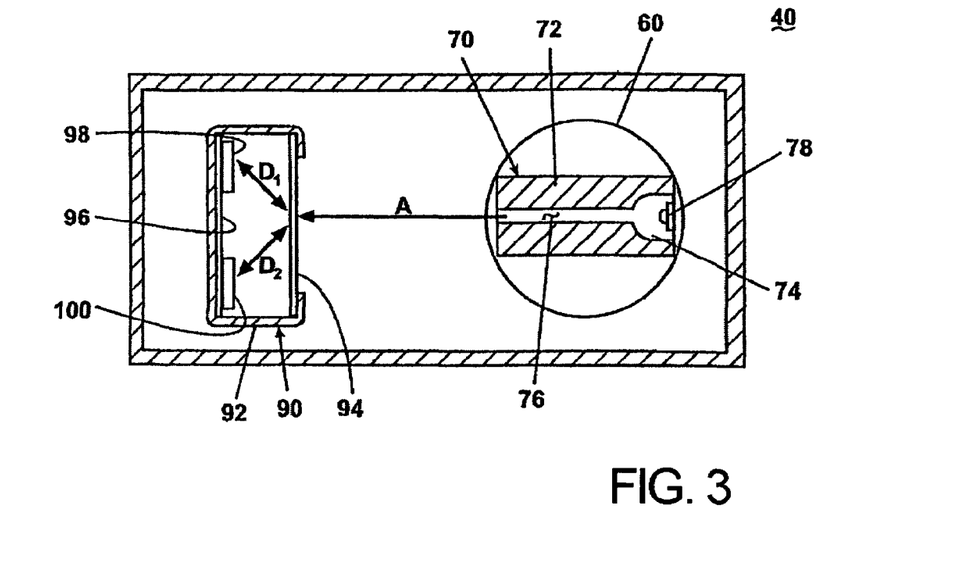
FIG. 3 is a sectional view of the sensor in FIGS. 1 and 2 and illustrating a light emitter for the sensor in a reference position relative to an optical bridge of a light sensor assembly.

In the reference position shown in FIG. 3, the light emitter 70 emits a beam of light along path A. As the beam of light contacts the diffuser element 94 of the light sensor assembly 90, rays of diffused light contact the spaced light sensors 98. The rays of light travel a distance D1 and D2 from the diffuser element 94 to the light sensors 98, 100, respectively. The distance the light travels impacts the intensity of the light as seen by the light sensors, resulting in a corresponding voltage output from the sensors.

Figure 4:
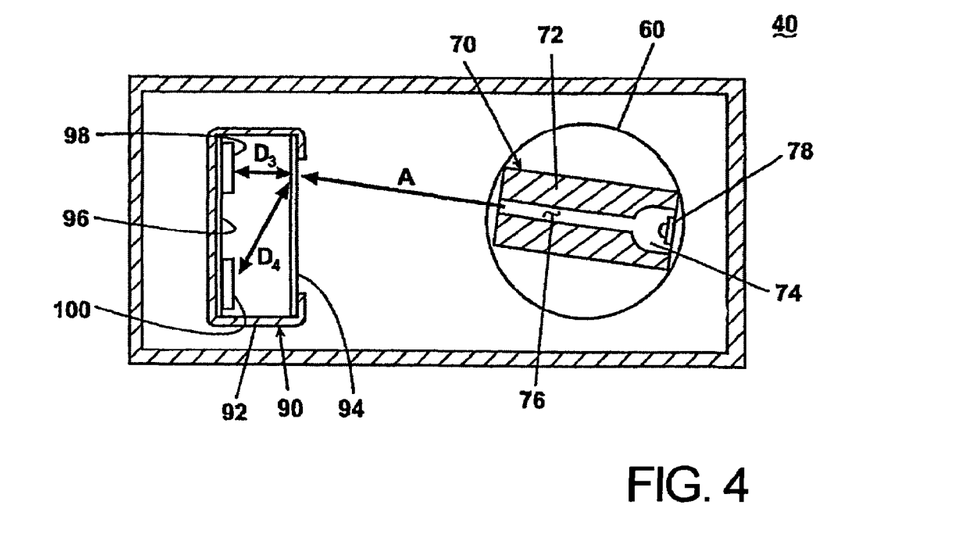
FIG. 4 is identical to FIG. 3 except that the light emitter is shown in an alternative position relative to the optical bridge.

Referring to FIG. 4, if the height of the vehicle is changed, such as by loading or unloading product from the vehicle, the trailing arm 14 will rotate relative to the frame bracket 18, resulting in a corresponding rotation of the outer sleeve 50, which results in a corresponding rotation of the external shaft 60 of the height sensor 40. As the height sensor external shaft 60 rotates, the light emitter 70 is rotated into a new position and the light beam A strikes the diffuser element 94 at a different location. The rays of light emanating from the diffuser element 94 and entering the light sensors 98 now must travel through distances D3 and D4. As can be seen by comparison with the distances D1, D2, the distance D3 for the light ray to enter the sensor 98 is less than the previous distance D1. Conversely, the distance D4 is greater than the distance D2 for the light to enter light sensor 100. The change in the position of the light emitter 70 from FIG. 3 to FIG. 4 results in the sensor 98 receiving a higher intensity light and the sensor 100 receiving a lower intensity light. The change in the intensity corresponds to a change in the voltage output signal of the light sensors 98, 100. The change in the output signals from the sensors, 98, 100 is directly related to the rotational change in the trailing arm 14 relative to the vehicle frame 12 and provides a measure for the change in height of the vehicle from the predetermined position. The output from the light sensors 98, 100 can be used to control the introduction and exhaustion of pressurized air in to the air springs to raise or lower the vehicle frame until the light emitter 70 is rotated back to the reference position.

Figure 5:
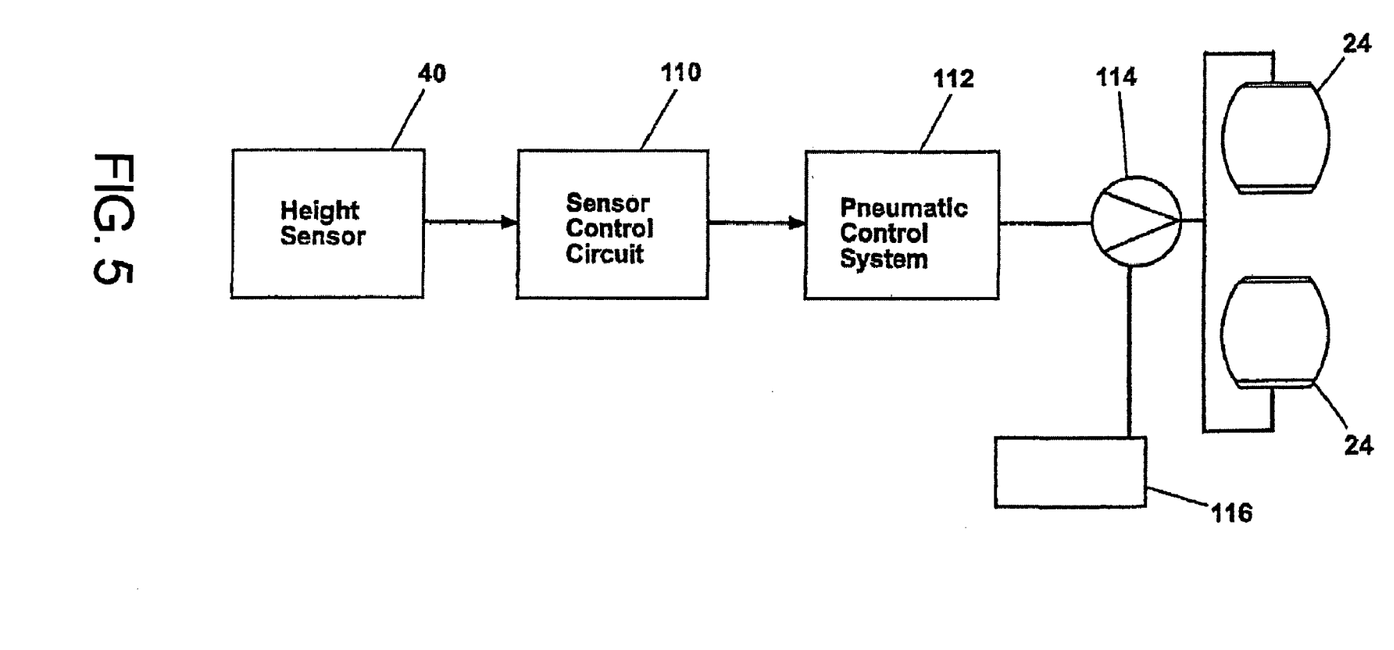
FIG. 5 is a block diagram of the control system showing the interaction between the height sensor and the vehicle pneumatic control system by an intervening sensor control circuit.

FIG. 5 diagrammatically illustrates the interaction of the sensor 40 with respect to the pneumatic control system 112 that introduces and exhausts pressurized air from the airbag 24 of the vehicle. The height sensor 40 is preferably a transducer that is electrically coupled to a sensor control circuit 110, which is electrically coupled to the pneumatic control system 112. The pneumatic control system 112 controls a valve 114 that fluidly connects a reservoir of pressurized air 116 to the airbag 24 or fluidly connects the airbag 24 to atmosphere. The valve 114 is preferably a solenoid-actuated valve that is responsive to an output signal from the pneumatic control system 112. The air reservoir 116 is preferably the air reservoir that is commonly found on all vehicles using pneumatic suspension systems.

In general, the height sensor 40 outputs a signal corresponding to the change in light intensity as seen by the light sensors 98, 100 of the optical bridge 96 to the sensor control circuit 110. The sensor control circuit conditions the signal from the light sensors and determines the change in the vehicle height and outputs a corresponding signal to the pneumatic control system 112. The pneumatic control system then controls the actuation of the valve 114 to either add or exhaust pressurized air to the airbag 24 to raise or lower the vehicle frame as required.

Figure 6:
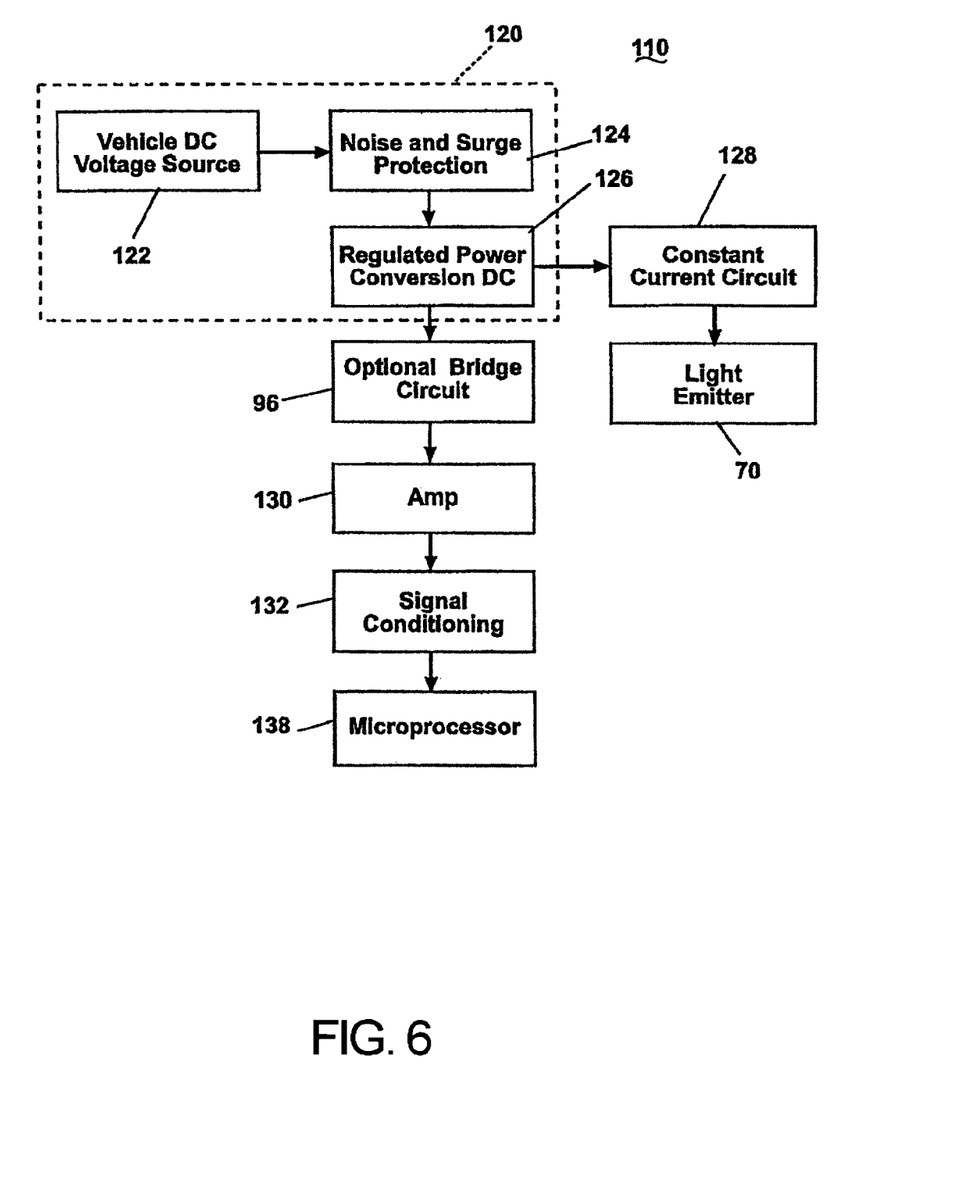
FIG. 6 is a schematic illustration of the sensor control circuit for the optical bridge.

FIG. 6 schematically represents the sensor control circuit 110. It should be noted that there are many different possible electrical solutions for implementing the sensor control circuit. The exact implementation is not germane to the invention.

Sensor control circuit 110 comprises a voltage control circuit 120 that preferably comprises a DC voltage source 122, preferably that of the vehicle. The DC voltage source is passed through a noise and surge protection circuit 124 to eliminate voltage spikes and other undesirable components from the voltage supply. The output from the noise and surge protection circuit is then directed to a regulated power conversion circuit 126. The output from the regulated power conversion circuit 126 is directed both to the optical bridge 96 and the light emitter 70. The regulated power passes through a constant current circuit 128 prior to being supplied to the light emitter to ensure no fluctuations in the output intensity of the light emitter.

The output from the optical bridge 96 is amplified by an amplifier 130. The amplifier is preferably an instrumentation amplifier or a low noise differential amplifier. The amplified signal is then sent to a signal conditioning circuit 132, which eliminates unneeded or undesirable portions of the signal. The conditioned signal is then sent to a microprocessor 138 that compares the conditioned signal to a reference value corresponding to a reference signal sent when the light emitter 70 is in the reference position. The microprocessor 138 can also monitor changes and rate of changes in the signal to determine the time rate of change in the vehicle height, which is helpful in preventing adjustments to the vehicle for temporary height changes. The output from the microprocessor is then sent to the pneumatic control system 112 for use in adjusting the vehicle height.

The signal sent by the sensor 40 is normally representative of the change in the position of the trailing arm relative to a reference position. Generally, the reference position of the trailing arm will be the position where the vehicle is at the predetermined ride height. However, the sensor will work even if the arm reference position does not coincide with the vehicle ride height.

Figure 7:
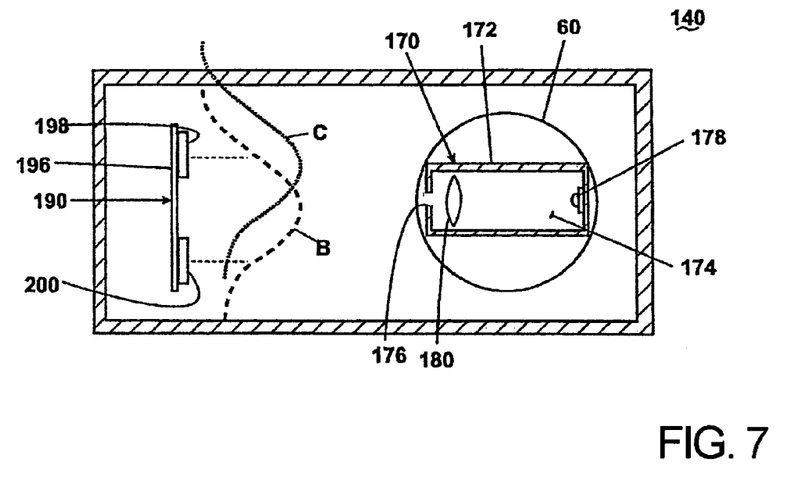
FIG. 7 illustrates a second embodiment height sensor according to the invention.

FIG. 7 illustrates a second embodiment height sensor 140 where the height sensor 140 is similar to the first embodiment height sensor, like numerals will be used to identify like parts; only the major distinctions between the first and second embodiments will be discussed in detail. The height sensor 140 comprises a light emitter 170 that is mounted to the external shaft 60 and emits a diffracted light pattern onto a light sensor 190. The light emitter 170 comprises a block 172 having a light chamber 174 and diffraction slit 176 optically connecting the light chamber 174 to the exterior of the block 172. A light emitter, such as an LED or diode laser is disposed within the light chamber 174. A collimating lens 180 is disposed between the light source 178 and the diffraction slit 176.

A light sensor assembly 190 comprises an optical bridge 196 having spaced light sensors 198, 200. The optical bridge 190 is not enclosed within a housing as was the first embodiment. Also, there is no diffuser element positioned between the optical bridge 196 and the light emitter 170.

The light emitter 170 emits a diffraction pattern as illustrated by the dashed line B. The dashed line B represents the intensity of the light relative to the light sensors 198, 200. As can be seen, in the reference position as illustrated in FIG. 7, the greatest intensity of the diffraction pattern is substantially centered between the light sensors 198, 200. The light sensors 198, 200 are preferably positioned so that they see the portion of the diffraction pattern that is approximately 50% of the maximum intensity. As the external shaft 60 rotates (for example, clockwise in FIG. 7) in response to a change in the vehicle height, the diffraction pattern moves laterally relative to the optical bridge 196 as illustrated by diffraction pattern C. The movement of the diffraction pattern alters the intensity of light as seen by the sensors 198, 200. The optical bridge 196 outputs a voltage signal that corresponds to the intensity as currently seen by the optical sensors 198, 200. This output signal is processed in the same manner as the output signal for the first embodiment as previously described.

For the second embodiment, it is preferred that the light emitter be either a high output narrow band infrared LED (approximately 940 nm) or an infrared diode laser. The light from the light emitter is preferably matched or optimized with the sensitivity of the light sensors 198, 200, which can be either photoconductive cells, infrared photodiodes, infrared photovolactic cells, for example.

It is also important to the invention that the light emitted by the light emitter 70 be collimated and then emitted through a slit to generate the diffraction pattern. Therefore, the shape of the slit must be precisely controlled to obtain the diffraction pattern. For example, if a light emitter emits a wavelength of 940 nm, then the slit should be on the order of 0.00005 m to 0.0001 m. The light leaving the slit 176 should travel a distance that is relatively large compared to the slit before contacting the optical bridge. In the above example, a distance of 5 cm is sufficient.

Figure 8:
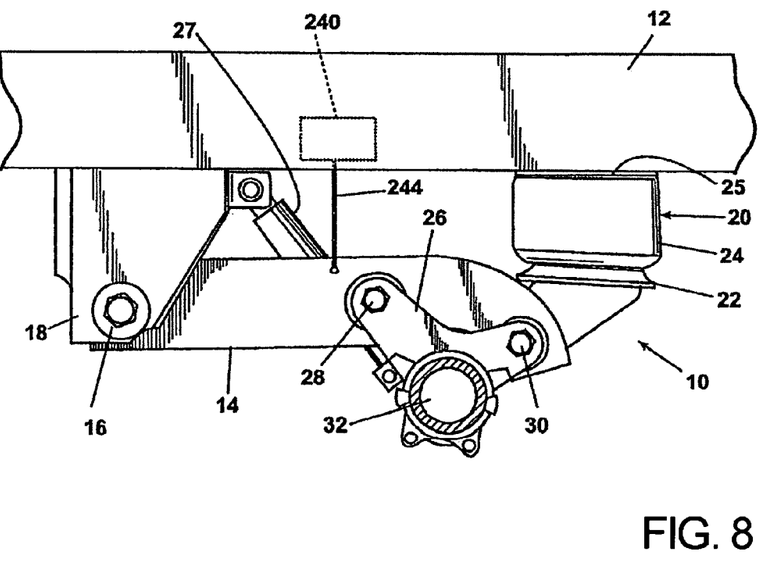
FIG. 8 illustrates a trailing arm suspension incorporating a third embodiment height sensor according to the invention.

FIG. 8 illustrates a third embodiment height sensor 240 in the environment of the trailing arm suspension and vehicle shown in FIG. 1. The third embodiment sensor 240 is substantially identical to the first embodiment, except that the height sensor 240 monitors the height change in the trailing arm 14 instead of the rotational change of the trailing arm 14 to assess the change in the height of the vehicle frame a reference position. Therefore, like parts in the third embodiment as compared to the first and second embodiments will be identified by like numerals. For example, the height sensor 240 can use the same light emitter 70 and light sensor assembly 90 as disclosed in the first embodiment.

Figure 9:
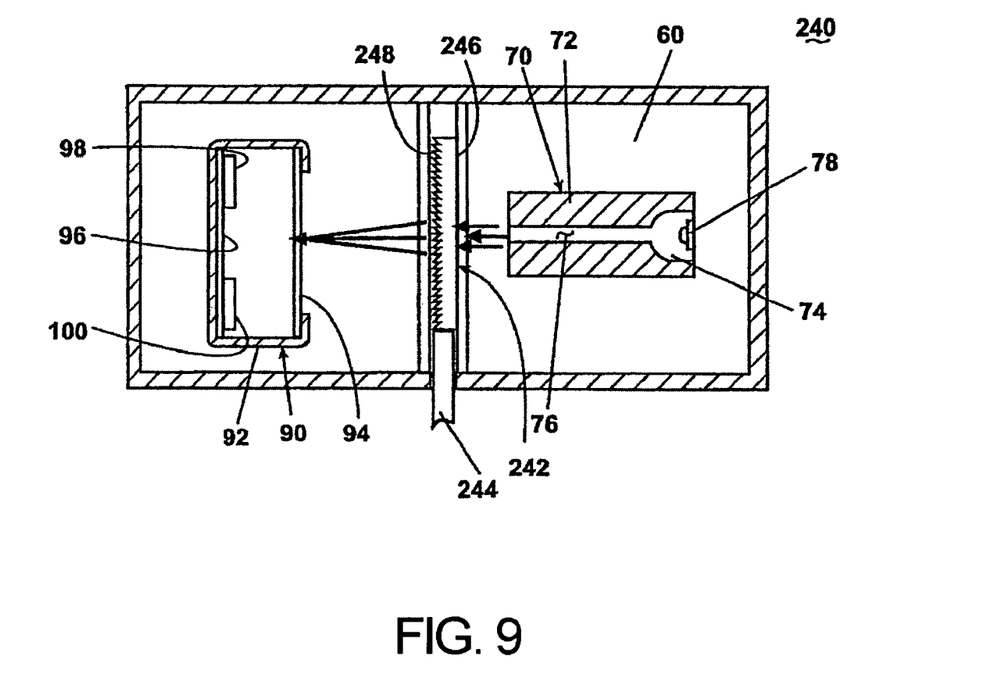
FIG. 9 is a sectional view of the third embodiment height sensor.

Looking at FIG. 9, it will be seen that the main difference between the height sensor 240 and the height sensor 40 is that the light emitter 70 is fixed and a transversely moving fresnel lens 242 is positioned between the light emitter 70 and the light sensor assembly 90. The fresnel lens 242 is operably coupled to the trailing arm 14 by a link 244. As the trailing arm pivots relative to the frame bracket 18, the link 244 reciprocates relative to the height sensor 240 and moves the fresnel lens 242 relative to the fixed position of the light emitter 70 and the light sensor assembly 90.

As is well known, a fresnel lens 242 comprises a series of concentric rings 248, with each ring having a face or reflecting surface that is oriented at a different angle such that light striking the planar surface 246 of the fresnel lens passes through the lens and is focused by the concentric rings to a predetermined focal point.

In the height sensor 240, the planar surface 246 of the fresnel lens 242 faces the light emitter 70 and the concentric rings 248 faces the diffuser element 94 of the light sensor assembly 90. Therefore, light emitted from the light emitter 70 and striking the planar surface 246 of the fresnel lens is focused by the concentric rings to a point on the diffuser element 94. The angular orientation of the refracting surfaces generated by the concentric grooves is selected so that the light emitted from the light emitter is focused at the location of the diffuser element 94.

As the trailing arm moves relative to the vehicle, the fresnel lens 242 moves laterally relative to the diffuser element to change the location of the focal point on the diffuser and thereby change the intensity of light as seen by the light sensors 98, 100. The point of light contacting the diffuser element 94 after passing through the fresnel lens 242 is processed in substantially the same manner as described for the first embodiment.

Figure 10:
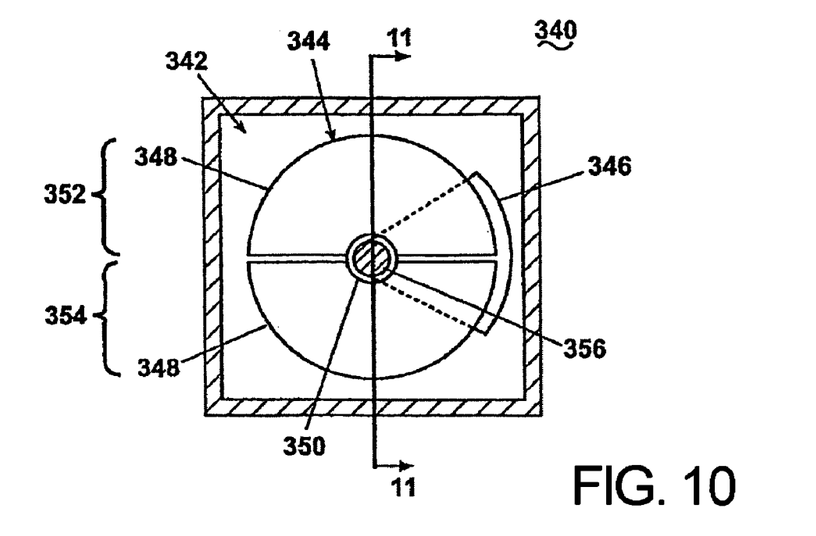
FIG. 10 is a sectional view of a fourth embodiment height sensor according to the invention.

FIG. 10 illustrates a fourth embodiment height sensor 340 according to the invention. The fourth embodiment height sensor 340 is similar to the first and second embodiments in that it responds to the rotational motion of the trailing arm 14 relative to the vehicle frame 12. The height sensor 340 is different in that it relies on a change in capacitance to generate a control signal for determining the change in height of the vehicle frame relative to the trailing arm 14.

Figure 11:
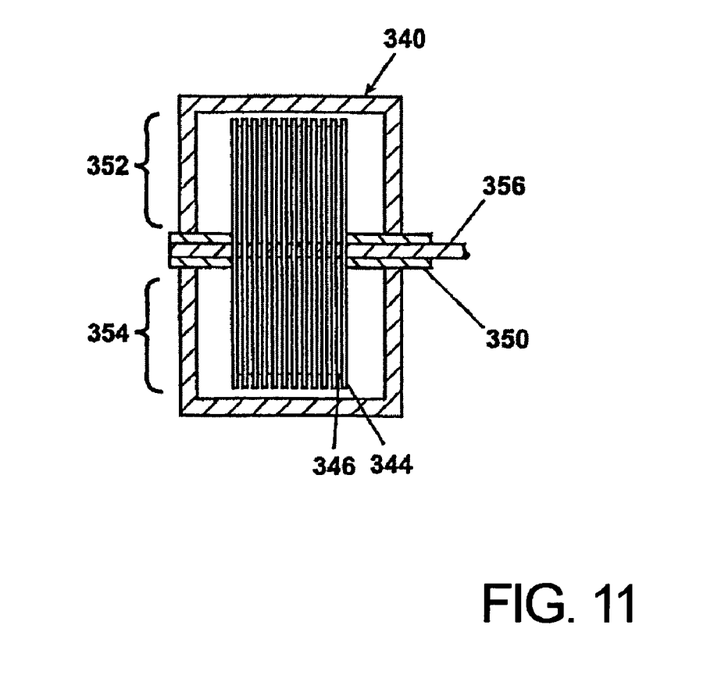
FIG. 11 is a sectional view taken along line 11-11 of FIG. 10 for the fourth embodiment height sensor.

The height sensor 340 has a variable capacitor comprising a set of spaced stationary plates 344 between which is disposed a set of moveable plates 346, which forms a capacitor bridge circuit 342. The stationary plates 344 are formed by a pair of opposing semi-circular plates 348, with each semi-circle being mounted to a support tube 350. The semi-circular plates 348 are mounted the support tube 350 in such manner that they are spaced slightly from each other to effectively divide the stationary plates 344 into a first and second series 352, 354, respectively. The first and second series 352, 354 are electrically distinct. The moveable plates 346 have a sector or pie-wedge shape and are mounted to a rotatable control shaft 356 that is mounted within the support tube 350 and connected to the external shaft 60 so that rotation of the shaft results in the rotation of the moveable plates 346 relative to the stationary plates 344.

In the preferred referenced position, the moveable plates 346 are positioned relative to the first and second series 352, 354 of the stationary plates 344 so that the gap between the first and second series 352, 354 is approximately centered relative to the moveable plate. The space between the stationary plates and moveable plates is preferably filled by a suitable dielectric material.

In operation, as the trailing arm 14 rotates relative to the vehicle frame 12 in response to a change in height of the vehicle, the external shaft 60 rotates the control shaft 356 correspondingly, which moves the moveable plates 346 relative to the first and second series 352, 354 of semi-circular plates. As the moving plates cover more area on one series of semi-circular plates, the capacitance on that series of semi-circular plates increases, resulting in a capacitive differential between the first and second series of plates. The difference in capacitance is related to the magnitude of the height change and is outputted by the height sensor for use in adjusting the height of the vehicle.

Figure 12:
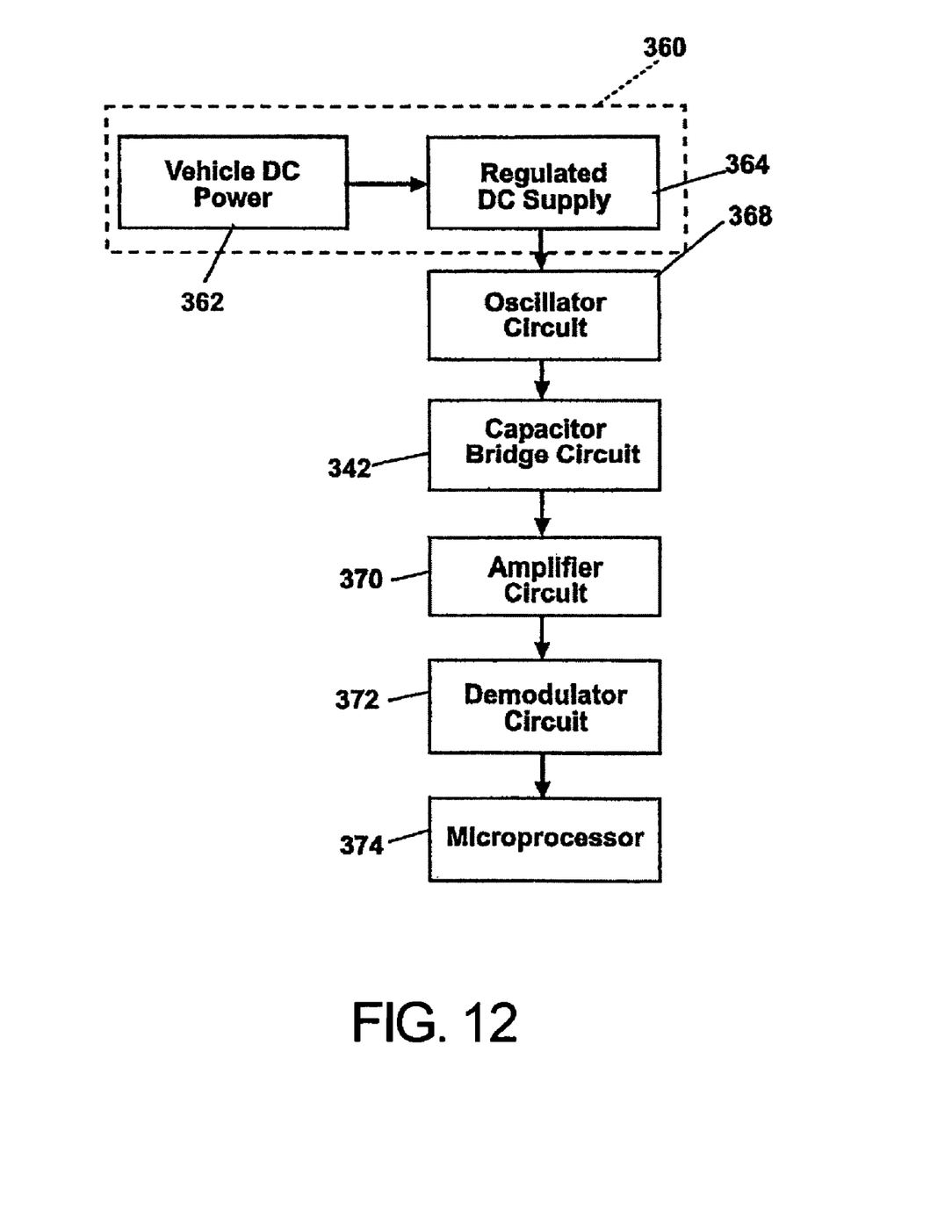
FIG. 12 is a schematic illustration of the sensor control circuit for the fourth embodiment height sensor.

Referring to FIG. 12 the sensor control circuit 110 for the height sensor 340 comprises a power supply 360, including a power source 362, which is preferably obtained from the vehicle power source regulated by a regulating circuit 364. The regulated power is fed to an oscillating circuit 368 used to excite or charge the stationary and moveable plates 344, 346, respectively, of the capacitor bridge circuit 342. The output from the capacitor bridge circuit 342 is directed to an amplifier circuit 370, whose amplified output is then passed through a demodulator circuit 372 to transform the amplified oscillating signal into a steady voltage signal that is proportional to the rotation angle of the trailing arm. The proportional voltage signal is then input to a microprocessor 374 where the signal is monitored to assess any change in the rotational angle relative to a reference value. As with the other embodiments, the microprocessor 374 can immediately act on the voltage input signal or monitor the voltage input signal over a predetermined time period before sending an output signal to the pneumatic control system 112. In most cases, it will be preferred to monitor a predetermined time period of the voltage input signal with the microprocessor 374 to delay adjusting the vehicle height for transitory changes.

Figure 13:
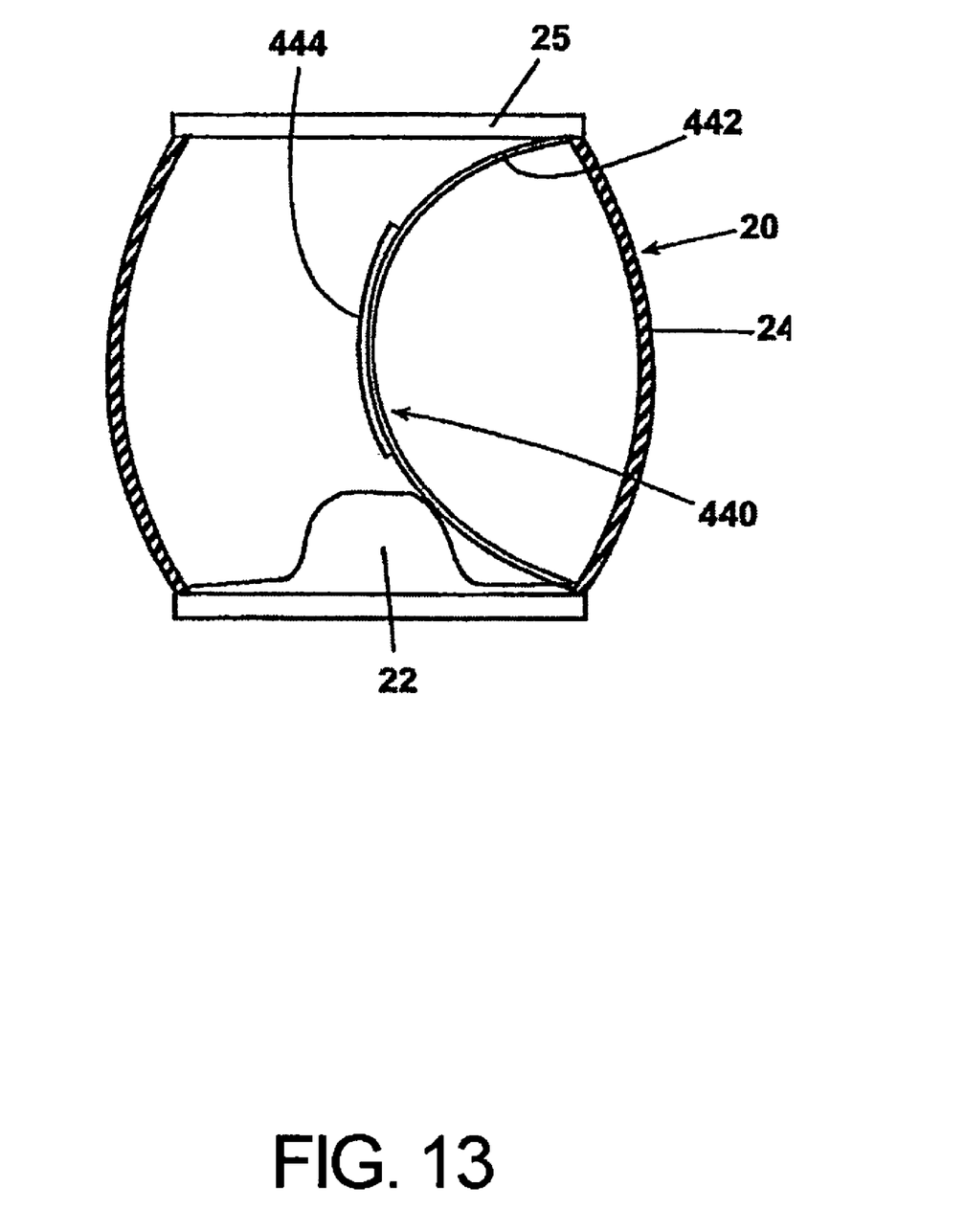
FIG. 13 illustrates a fifth embodiment height sensor according to the invention.

FIG. 13 illustrates a fifth embodiment height sensor 440 according to the invention. Unlike the first four embodiments, the height sensor 440 is operably coupled to the trailing arm but not through a direct connection. Instead, the height sensor 440 is located within the interior of the air spring 20. The height sensor 440 comprises a spring plate 442 having one end connected to the top plate 25 of the air spring 20 and another portion connected to the piston 22 of the air spring 20. A flexible variable resister 444 is fixed to the spring plate 442. The flexible variable resister is well known and described in detail in U.S. Pat. No. 5,086,785, which is incorporated herein by reference. The flexible resister 444 varies its resistance as it is bent.

The characteristic of the flexible variable resister 444 changing its resistance in response to its bending is used to indicate the amount of height change in the vehicle relative to a reference position. For example, as the height of the vehicle changes in response to the loading or unloading of the vehicle, the airbag 24 will correspondingly compress or expand, resulting in a bending of the spring plate 442 and the flexible variable resister 444. The change in the resistance of the flexible variable resister 444 then becomes an indicator of the degree of height change.

For consistency, it is important that the flexible variable resister 444 repeatedly bend in the same manner. The spring plate 442 provides a base for the flexible variable resister 444 and aids in the repeated consistent bending of the flexible variable resister 444.

Figure 14:
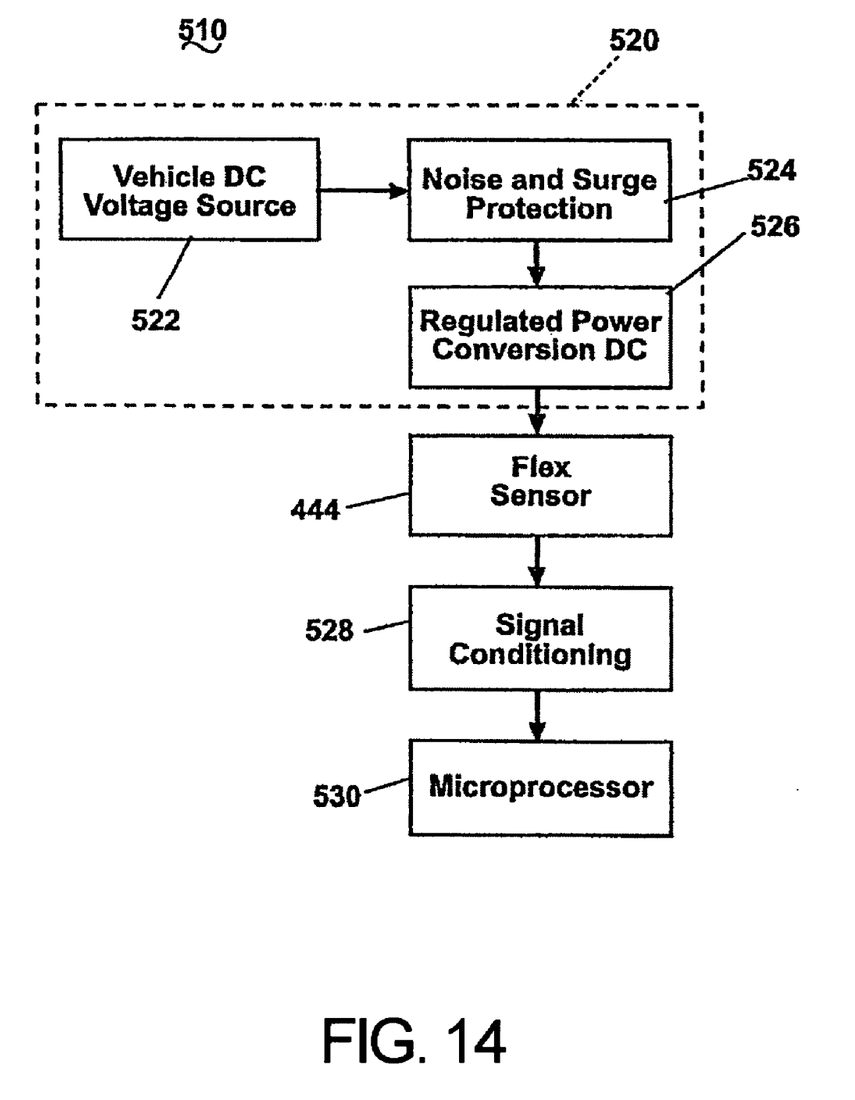
FIG. 14 is a schematic representation of the control circuit for the fifth embodiment height sensor.

Referring to FIG. 14, the sensor control circuit 510 for the height sensor 440 is schematically illustrated. The sensor control circuit 510 for the height sensor 440 is substantially identical to the sensor control circuit 110 for the first through third embodiments, except that the optical bridge is replaced by the flexible variable resister 444.

The sensor control circuit 510 comprises a regulated DC voltage supply 520 including a DC power source 522, preferably the vehicle DC power source, which passes through a noise and surge protection circuit 524 and then through a regulated DC power conversion or constant current source circuit 526. The regulated DC supply 520 outputs a voltage signal to the flexible variable resister 444, whose output signal is conditioned by a signal conditioning circuit 528 before it reaches a microprocessor 530. As with the previous embodiments, the microprocessor processes the conditioned output signal from the height sensor 440 to determine the change in the vehicle height and thereby introduce or exhaust pressurized air from the airbags 24 to adjust the vehicle height as needed.

It is worth noting that the sensor control circuit for each embodiment disclosed herein need not necessarily input a signal to a microprocessor. The sensor control circuit can output a voltage signal for use by other types of controllers or comparators to implement the pneumatic system.

Figure 15:
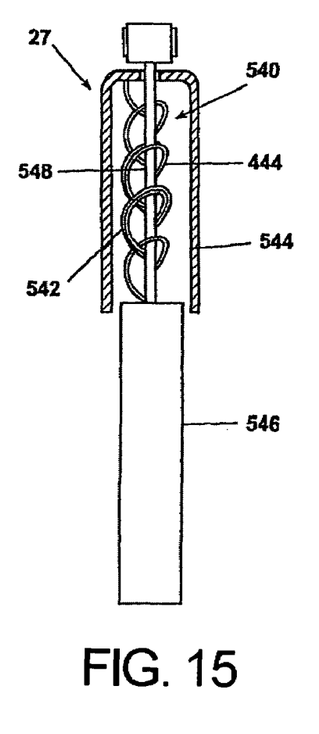
FIG. 15 illustrates a sixth embodiment height sensor according to the invention in the context of a shock absorber.

FIG. 15 illustrates a sixth embodiment height sensor 540 according to the invention. The height sensor 540 is similar to the height sensor 440 in that it uses a flexible variable resistor 444 which is wrapped about the coils of a helical or coil spring 542. The coil spring 542 is disposed within the interior of the shock absorber 27.

The shock absorber comprises an exterior cover 544 that is moveably mounted to and overlies a cylinder 546 from which extends a piston shaft 548, which also extends through the cover 544. The coil spring 542 is wrapped around the piston shaft 548 and has one end attached to the cover 544 and another end attached to an upper portion of the cylinder 546.

The height sensor 540 functions substantially identically to the height sensor 440 in that as the trailing arm 14 rotates relative to the vehicle frame 12, the shock absorber cover 544 reciprocates relative to the housing 546 to compress or expand the coil spring 542, which bends the flexible variable resistor 444. As with the height sensor 440, the bending of the flexible variable resistor 444 and the height sensor 540 results in the height sensor 540 outputting a signal that corresponds to the relative movement of the vehicle frame 12 and trailing arm 14.

Figure 16:
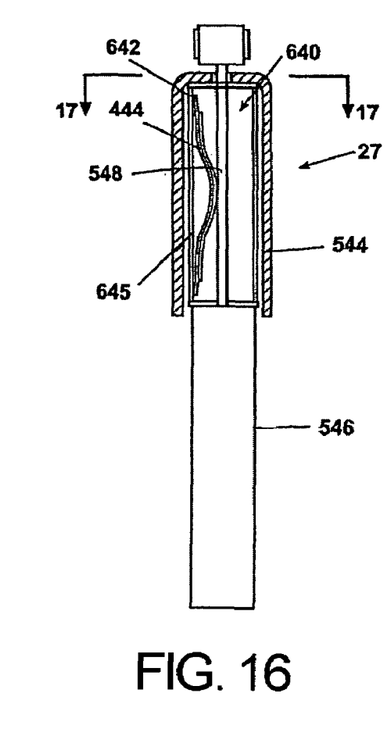
FIG. 16 illustrates a seventh embodiment height sensor according to the invention.
Figure 17:
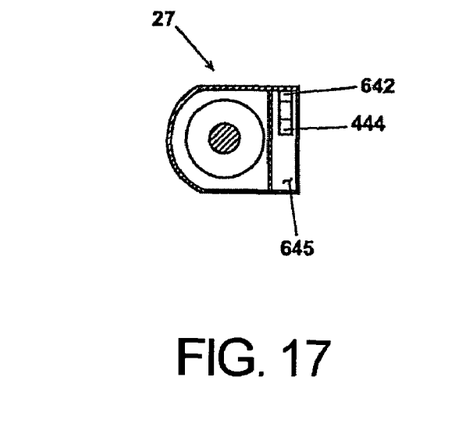
FIG. 17 is a sectional view taken along line 17-17 of FIG. 16.

FIGS. 16 and 17 illustrate a seventh embodiment height sensor 640 according to the invention and also in the context of a shock absorber 27. The distinction between the seventh embodiment height sensor 640 and the sixth embodiment height sensor 540 is that a spring plate 642 is used in place of the coil spring 542. The spring plate 642 is retained within a separate chamber 645 formed in the cover 544 of the shock absorber.

As with the height sensor 440 the spring plate 642 of the height sensor can have various initially bent shapes. For example, the spring plate as disclosed in the height sensor 440 has a predominately c-shaped profile whereas the spring plate 642 has a half period of a sine wave profile or, in other words, inch-worm-like profile. The profile can just as easily be an S-shape oriented either vertically or horizontally or multiple sinusoidal waves.

It is important to note that while the preferred use of the many sensors disclosed herein is in a trailing arm suspension, the sensors have many more uses or applications in addition to a trailing arm suspension. For example, the sensors can be used in many different types of vehicles where monitoring of the vehicle ride height is desired. The sensors can also be used on suspensions other than a trailing arm suspension. Other exemplary suspensions include: leaf suspensions, bolster beam suspensions, and independent suspensions, to name a few. As a further example, any vehicle that uses an air spring or a shock absorber can use the at least one of the sensors described herein for height control or for other functions.

The sensors can also be used for functions other than height control. For example, the sensors could be placed on the king pin of a fifth wheel trailer connection to sense the rotational position of the king pin relative to the trailer to aid in properly coupling the trailer to the tractor. The sensors could be used to monitor the position of the trailer dolly.

The sensors can also be used outside of the vehicle environment. The rotation driven sensors are highly suitable for use in monitoring the rotational position of some object or converting translational movement into a corresponding rotation. The bending-based sensors are suited for sensing the relative change (rotational or translational) between two objects.

While the invention has been specifically described in connection with certain specific embodiments thereof, it is to be understood that this is by way of illustration and not of limitation, and the scope of the appended claims should be construed as broadly as the prior art will permit.

What is claimed is:

1. A height control system for a vehicle comprising a suspension having an arm, with a portion thereof pivotally mounted to the vehicle, and an air spring positioned between the vehicle and another portion of the arm, and an air system for at least supplying pressurized air to the air spring, the height control system comprising:
    a valve to selectively fluidly connect the air spring to either the air system or the atmosphere for selectively introducing or exhausting air from the air spring to effect relative movement of the arm and the vehicle to adjust a height of the vehicle;
    a sensor coupled that senses rotational movement of the arm and sends an out-put signal indicative of an amount of relative pivotal movement between the arm and the vehicle;
    a controller coupled to the sensor and to the valve wherein the controller receives the sensor output signal and selectively actuates the valve in response to the output signal to adjust or maintain the height of the vehicle; and
    wherein the sensor comprises at least one of the following:
        a light sensor comprising a light emitter and an optical bridge, wherein the light emitter is coupled to and moves with the arm and wherein the optical bridge is coupled to the vehicle such that the light beam is moved to strike various positions on the optical bridge with varying intensities;
        a capacitive sensor comprising a plurality of layers of stationary plates interleaved with a plurality of layers of moveable plates so as to form a capacitive sensor defined by at least four interleaved layers of plates.

2. The height control system according to claim 1 wherein the output signal is representative of pivotal movement of the arm relative to a reference position for the arm.

3. The height control system according to claim 2 wherein when the arm is in the arm reference position, the vehicle is at a predetermined ride height.

4. The height control system according to claim 1 wherein the output signal is representative of a change in height of the arm corresponding to a sensed pivotal movement.

5. The height control system according to claim 1 wherein the controller, in response to the output signal, operates the height control system between an off mode, where the air spring is fluidly disconnected from the air system and from atmosphere, a fill mode, where the valve fluidly connects the air spring to the air system, and an exhaust mode, where the valve fluidly connects the air spring to atmosphere.

6. The height control system according to claim 1 wherein the light sensor comprises multiple spaced photosensitive cells, with at least one of the photosensitive cells being disposed at each of the various positions on the optical bridge struck by light emitted by the light emitter.

7. The height control system according to claim 1 wherein the light sensor further comprises a wall with a diffraction slit disposed between the light emitter and the optical bridge so that the light projected from the light emitter passes through the diffraction slit and is diffracted prior to reaching the optical bridge.

8. The height control system according to claim 7 wherein the light sensor further comprises a collimating lens disposed between the light emitter and the wall with the diffraction slit.

9. The height control system according to claim 1 wherein the sensor comprises a capacitive sensor comprising a plurality of layers of stationary plates interleaved with a plurality of layers of moveable plates so as to form a capacitive sensor defined by at least four interleaved layers of plates.

10. The height control system according to claim 9 wherein each of the plurality of layers of stationary plates is defined by a pair of semi-circular plates mounted on a support tube so as to be spatially separated from one another.

11. The height control system according to claim 9 wherein each of the plurality of layers of moveable plates is defined by a single wedge-shaped plate mounted to a rotatable control shaft.

12. A sensor for sensing the position of a first movable object relative to a second moveable object comprising:
    a light sensor having a portion coupled to one of the first and second moveable objects to sense rotational movement of the first and second movable objects relative to each other, and adapted to send a signal related to said rotational movement;

said light sensor including an optical bridge having multiple spaced photosensitive cells and a light emitter that projects light onto the optical bridge and the optical bridge generates the output signal which corresponds to the intensity of the projected light across the optical bridge;

a light diffuser panel disposed between the light emitter and the optical bridge;

wherein the light emitter is coupled to one of said first or said second moveable objects such that movement of the moveable object correspondingly moves the light emitter to alter the location where the projected light contacts the optical bridge to change the light intensity seen by each photosensitive cell.

13. The sensor according to claim 12 wherein the transducer output signal is representative of the rotational movement of the moveable object relative to a reference position for the moveable object.

14. A sensor for sensing the position of a suspension assembly for a vehicle comprising:

a light emitter coupled to a suspension arm for the vehicle and transmitting a signal related to the rotational movement of the suspension arm relative to a frame of the vehicle;

an optical bridge having multiple spaced photosensitive cells;

said light emitter transmitting a signal that impinges upon said optical bridge, said optical bridge generating an output signal which corresponds to the intensity of the projected light across the optical bridge related to the rotational movement of the suspension arm;

wherein rotational movement of the suspension arm correspondingly moves the light emitter to alter the location where the projected light contacts the optical bridge to change the light intensity seen by each photosensitive cell.

15. The sensor according to claim 14 further comprising a light diffuser panel disposed between the light emitter and the optical bridge.

* * * * *